United States Patent

Scaramuzzo et al.

[19]

[11] Patent Number: 5,917,670
[45] Date of Patent: Jun. 29, 1999

[54] METHOD FOR RECOVERING DATA FROM DISK WITH MAGNETO-RESISTIVE HEAD IN PRESENCE OF THERMAL ASPERITIES

[75] Inventors: John A. Scaramuzzo, Medway; James D. Sawin, Sterling; Bruce D. Buch, Westboro, all of Mass.; Russell W. Brown, Nepean, Canada; Nick Horgan, Marlboro, Mass.

[73] Assignee: Quantum Corporation, Milpitas, Calif.

[21] Appl. No.: 08/734,782

[22] Filed: Oct. 15, 1996

[51] Int. Cl.⁶ .................................................. G11B 5/09
[52] U.S. Cl. ........................ 360/53; 360/65; 360/46; 360/67; 360/66; 360/51; 360/77.08; 360/25
[58] Field of Search .................... 360/25, 53, 65, 360/46, 67, 66, 113, 51, 77.02, 77.08

[56] References Cited

U.S. PATENT DOCUMENTS

| | | |
|---|---|---|
| 3,975,772 | 8/1976 | Lin . |
| 5,122,915 | 6/1992 | Klein et al. . |
| 5,233,482 | 8/1993 | Galbraith et al. . |
| 5,241,546 | 8/1993 | Peterson et al. . |
| 5,255,136 | 10/1993 | Machado et al. . |
| 5,497,111 | 3/1996 | Cunningham . |
| 5,537,034 | 7/1996 | Lewis ................................ 360/72.1 X |
| 5,680,265 | 10/1997 | Noguchi ............................... 360/113 X |
| 5,701,314 | 12/1997 | Armstrong et al. .................... 371/40.3 |
| 5,754,355 | 5/1998 | Nakamura et al. .................. 360/113 X |

OTHER PUBLICATIONS

Data Sheet, VM6130 Magneto-Resistive Head, High Performance, Read/Write Preamplifier, VTC Inc., Aug. 1996.

Data Sheet, SSI 32R1510BR MR Head Read/Write Device, Silicon Systems, Dec. 1993, copyright 1994.

"Disk Drive Interface Guide", *Mass Storage Handbook*, Chapter 9, pp. 9–3 through 9–158, National Semiconductor Corporation, copyright 1989.

*Primary Examiner*—Alan Faber
*Attorney, Agent, or Firm*—David B. Harrison

[57] ABSTRACT

Momentary contact with a defect site of a data storage disk or free particle by a magnetoresistive read element of a flying head causes momentary heating and unwanted increase in element resistance (thermal asperity) which can disrupt hard disk drive data reading operations. Since the disk carries a predetermined data format, the disk drive controller correlates location of a thermal asperity to the format and thereupon selects from several available thermal asperity recovery methods a method most likely to minimize thermal asperity effect upon disk drive operation during rereading of data at the thermal asperity location.

23 Claims, 9 Drawing Sheets

METHOD FOR RECOVERING DATA FROM DISK WITH MAGNETO-RESISTIVE HEAD IN PRESENCE OF THERMAL ASPERITIES

FIELD OF THE INVENTION

The present invention relates to error handling within hard disk drives. More particularly, the present invention relates to a method and structure for recovering data from a storage disk with a magneto-resistive head in the presence of thermal asperities.

BACKGROUND OF THE INVENTION

A thermal asperity (TA) is an unwanted event sometimes occurring within hard disk drives employing a magneto-resistive (MR) read head element of a flying head or slider assembly. One way to increase data storage densities in magnetic hard disk drives having disks of a given size is to "fly" the head structure closer and closer to the disk surface than heretofore. Flying heights of one micro-inch are now being approached in hard disk drives. Unfortunately, disk surfaces are not perfectly smooth when viewed in a micro-inch domain. Also, occasional particulate contaminants may come between the slider and the disk surface.

When an MR read element comes into contact with a rough spot of the disk, or collides with a minute, freely moving contaminating particle, virtually instantaneous heating of the MR element occurs. In response to this sudden heating, resistance of the thin film MR stripe element quickly increases. Since a constant bias voltage or current is applied to bias the MR element during reading operations, the sudden increase in resistance is sensed by a preamplifier as a dramatic, rapid change in bias voltage, or a large baseline signal shift. This unwanted electrical signal shift (referred to hereinafter as a "thermal asperity" or "TA") can be several times larger than a signal shift induced by magneto-resistance effect in response to a magnetic flux transition recorded on the disk as user or servo data, etc.

Since the head preamplifier has a dynamic operating range optimized to expected signal magnitudes attributable to flux transitions, the out-of-range TA signal shift causes the electronics of the read channel to saturate. Once the read channel saturates, a relatively long time is needed to bring the channel back to nominal baseline operating conditions, and the saturation may remain over several subsequent data bit cells. Under a saturation condition, the read channel electronics of the disk drive cannot detect any recorded data transitions accurately.

There have been several prior approaches directed to solving or ameliorating the TA signal shift problem. One prior approach has focused upon changing the general characteristics of the read channel dynamics. In particular, one approach has been to increase the low frequency pole of the read channel bandpass. This approach is suggested in U.S. Pat. No. 5,233,482 to Galbraith et al, entitled: "Thermal Asperity Compensation for PRML Data Detection". This prior approach also included altering the dynamic operating range of a signal sampling analog-to-digital converter. Although this prior approach is relatively simple to implement, it does not provide comprehensive protection against data loss attributable to TA baseline signal shift.

Another approach has been to "subtract" out the TA baseline signal shift. However, the subtraction approach requires significant additional, complex and expensive electronics.

Another approach, described in U.S. Pat. No. 5,497,111 to Cunningham, entitled: "Peak Detection Circuit for Suppressing Magnetoresistive Thermal Asperity Transients in a Data Channel", calls for differentiating the incoming signal prior to gain normalization, and then passing the resultant signal through a modified amplitude qualification circuit to extract output pulses. One drawback of that approach is that since the incoming signal is differentiated before being gain-normalized, noise events, as well as magnetic flux transitions, are passed by the circuit, to a conventional ECC process as a lone safeguard to protect data integrity.

Thus, a hitherto unsolved need has remained for a more effective method and apparatus for recovering data from a magnetic recording disk with an MR head in the presence of thermal asperities.

SUMMARY OF THE INVENTION WITH OBJECTS

A general object of the present invention is to provide a method within a hard disk drive for recovering from thermal asperities caused in a magnetoresistive read element of a data transducer head in a manner overcoming limitations and drawbacks of the prior art.

Another general object of the present invention is to provide a series of thermal asperity recovery modes within a hard disk drive employing a magnetoresistive transducer and to have a drive controller "intelligently" select and apply a particular one of the recovery modes to recover from effects of the thermal asperity, based upon location of the thermal asperity in relation to known track format.

In accordance with one aspect of the present invention, a method for recovering data from a rotating data storage disk in the presence of thermal asperities induced in a magnetoresistive transducer comprises the steps of electrically detecting a thermal asperity in a disk drive read channel, correlating the detected thermal asperity to a known format of the track, selecting at least one of a plurality of thermal asperity data recovery modes based upon the location of the thermal asperity in the formatted track, and applying the selected at least one of the plurality of available thermal asperity recovery modes to recover data otherwise rendered unavailable by the thermal asperity.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

The present invention operates upon a premise that data recovery from TAs is not performed in real time, because any modifications made to the data channel to enhance data recovery from a TA may cause performance degradation during otherwise normal channel operations. Moreover, if a TA is severe, that detected situation alone causes a determination that some types of channel modifications are required for effective data recovery, and those modifications and subsequent detection efforts cannot be carried out during real time operation of the disk drive.

Figure 2:
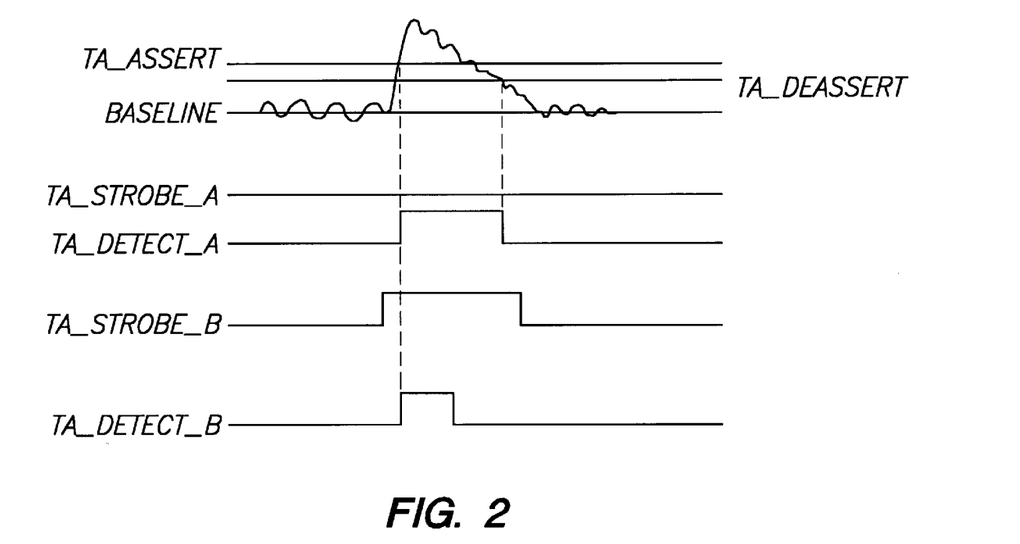
FIG. 2 is a graph of a TA and certain threshold levels and a TA detect signal generated during the TA recovery modes of the present invention, graphed along a common time base axis.
Figure 3:
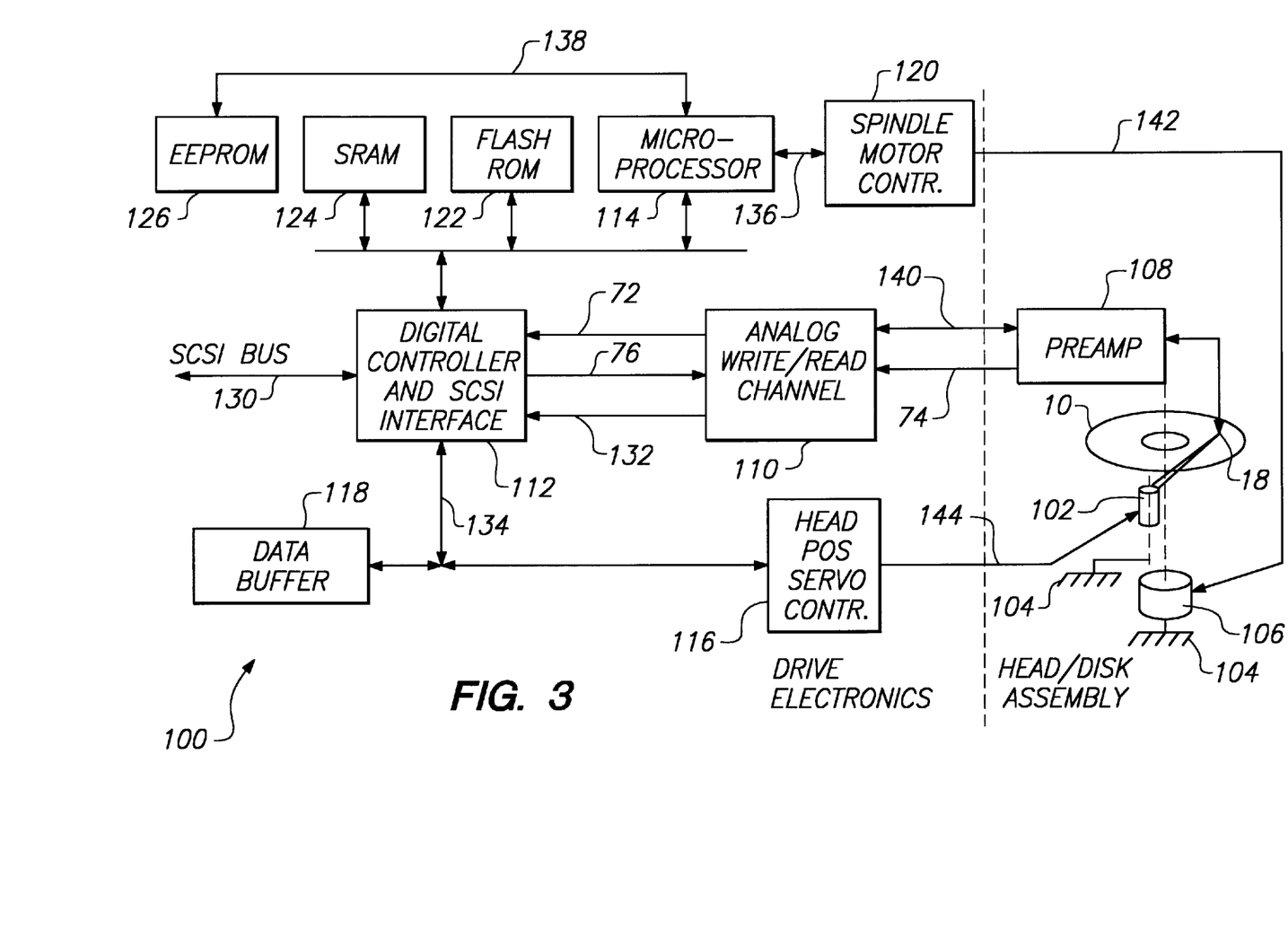
FIG. 3 is an electrical block diagram of a hard disk drive incorporating TA recovery modes in accordance with the present invention.

With reference to FIGS. 2 and 3, in order to facilitate non-real-time data recovery, a TA detect signal (TA_Detect_A) is generated within the analog read channel 110 by monitoring a Baseline amplitude level at e.g. the preamplifier 108 and signaling onset of a TA over a path 74 to the analog read channel chip 110. The analog read channel chip 110 then asserts the TA_Detect_A signal on a path 72 to a drive digital controller ASIC 112 when baseline signal amplitude exceeds a predetermined threshold TA_Assert. The TA_Detect_A signal is asserted over path 72 until the analog signal falls below a predetermined TA_Deassert threshold level, lower than the TA_Assert threshold. The TA_Detect_A signal results in calling and execution of one or more of the FIGS. 4–11 TA recovery subroutines by a drive microprocessor 114. The digital data controller 112 essentially captures and marks the time of the TA detect signal and the corresponding physical (byte) location of the TA within the format of the data storage track 12 being followed during read back operations of the disk drive 100. From TA physical location information in light of a known track format and instantaneous rotational position of the TA, one or more of a plurality of available data recovery processes may be selected and progressively applied under firmware control by the microprocessor 114 in order to attempt a data recovery. In addition, the digital controller ASIC 112 generates a data recovery TA_Strobe_B signal which is passed back to the analog read channel 110 over a path 76 in order to signal the analog channel 110 when to activate and apply a particular data recovery process during a subsequent revolution of disk 10 past the TA site.

By using the TA strobe signal on path 76 during a subsequent pass of the head over the TA, performance modifications made to a drive preamplifier 108 and analog channel chip 110 improve overall signal response to the particular TA event. Measurements have established that channel response to a TA is significantly slower than actual thermal response of the MR read element. Therefore, as other workers have previously noted, speeding up DC cancellation bandwidth at the front end of the analog read channel produces a significant reduction in the effective duration (length) of the TA.

Depending upon the location of the detected TA, the digital controller may direct the analog read channel to modify one or more of the following channel performance parameters:

a. increase DC cancellation bandwidth, thereby enabling faster tracking of baseline shift of the read signal ("fast DC feedback mode");

b. override and defeat amplitude qualification processes, thereby handling TAs occurring during a data preamble or data sync field ("zero threshold mode");

c. preset the AGC to a predetermined value, which may be invoked if the TA occurs in the middle of a data preamble field from which AGC control values are derived ("AGC preset mode");

d. assert a "coast" mode in which voltages on AC coupling capacitors of the read channel are held during the large TA baseline shift, thereby reducing the opportunity for analog channel saturation;

e. force a data pattern ("chunk") alignment decision to overcome phase distortion resulting from a TA to avoid a wrong serial data alignment decision, by using an opposite phase in lieu of a phase initially chosen in response to the TA distortion ("chunk flip mode");

f. generate separate thresholds for positive and negative data pulses so that data bit qualification may be improved in the event of signal baseline shift resulting from thermal asperities;

g. stop updating PLL charge pumps, so that the PLL will coast during this time, but the phase detectors will still be on ("PLL coast mode"); and h. change the MR head bias current setting, for example.

Depending upon the location of the detected TA, the drive firmware may invoke one of the following TA recovery modes at the drive microcontroller level:

a. use an enhanced error correction code process adapted specifically to correct burst errors resulting from TAs;

b. bypass digital and burst information including errors of a given servo spoke by substituting and using like information obtained from a previous servo spoke ("skip-spoke mode").

Since TAs cause a variety of difficulties, depending upon the type of data being distorted, it is important to record the location of each TA.

Figure 1:
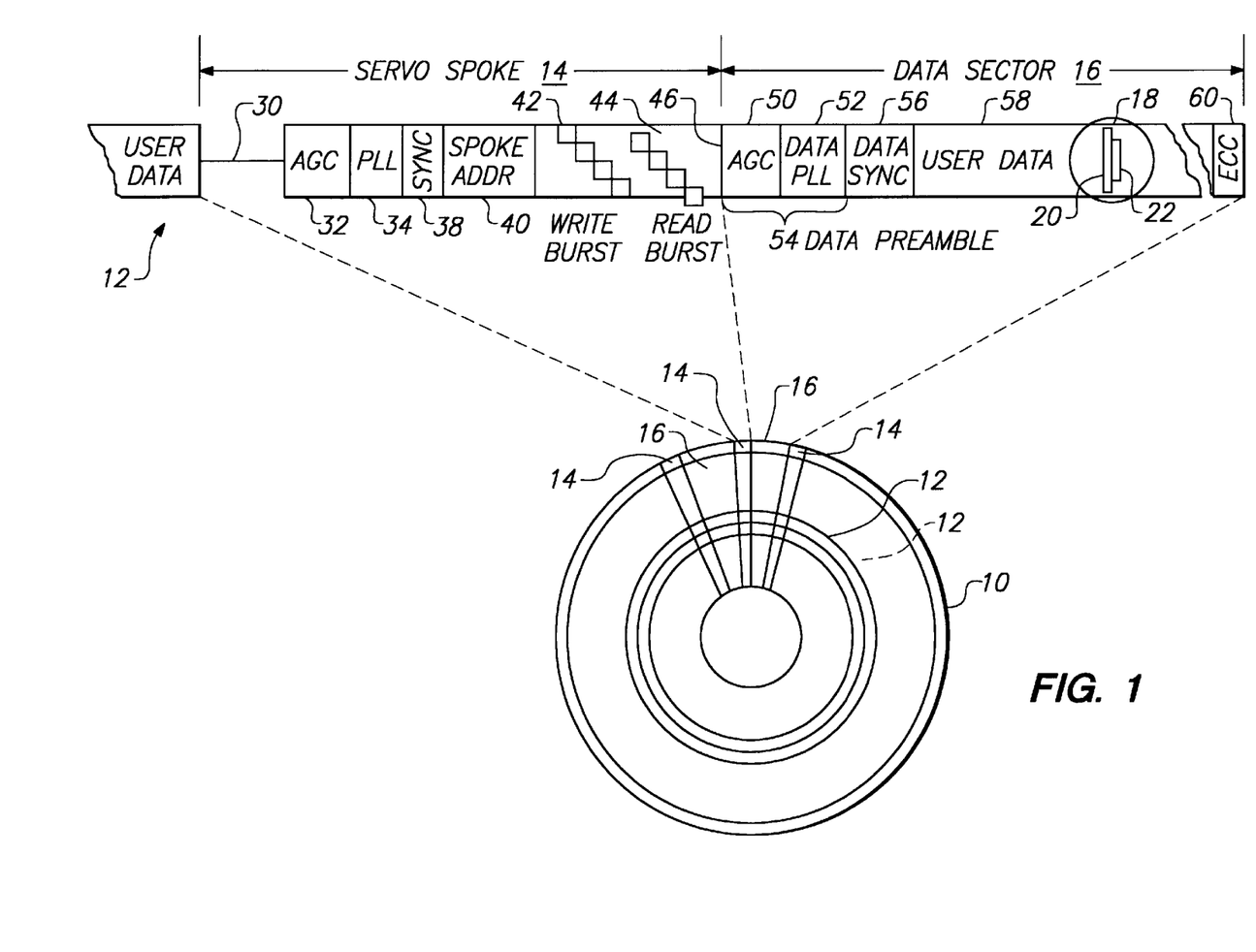
FIG. 1 is a diagram of a storage disk showing a greatly enlarged and linearized depiction of a servo sector and data sector within a circular track format of the FIG. 3 hard disk drive.

This importance will be more fully appreciated by considering FIG. 1. In FIG. 1, a rotating data storage disk 10 has at least one formatted data storage surface defining a multiplicity of concentric data tracks 12. Each track 12 is divided up into an alternating pattern of servo sectors or "spokes" 14, and data regions 16. In order to optimize raw data transfer rate, the tracks 12 are banded together into a plurality of radial data zones, such that a data transfer rate is optimized for a minimum-radius track within each zone.

A head transducer/slider structure 18 "flies" on an air bearing adjacent to the data recording surface. The structure 18 may include a relatively wide inductive write element 20 and a relatively narrow MR read element 22. As shown in FIG. 3, the head/slider structure 18 is typically positioned by a rotary voice coil actuator 102 referenced to a base 104, and an offset or skew is present between the read element 22 and the write element 20, depending upon radial position of the head 18 relative to the disk 10.

As depicted in the greatly enlarged and linearized track segment shown at the top of FIG. 1, each servo spoke 14 may include a DC erase gap 30, a servo AGC field 32, a servo PLL field 34, a servo address sync field 38 (also known as a "servo address mark"), a spoke address field 40, a write burst pattern field 42, and a read burst pattern field 44 (which is offset from the write burst pattern field by the skew angle present at the particular radius of the illustrated track 12). A write-splice region 46 marks beginning of the data sector 16. The data sector 16 may include an AGC field 50 and a data PLL field 52 forming a preamble 54, a data sync pattern field 56 (also known as a "data address mark pattern"), a user data field 58 for storing a known number of user data bytes, and an ECC (and cross-check) field 60 at the end of the data field 58. Usually, although not necessarily, the user data field 52 will hold a standard block size of data, such as 512 or 1024 bytes. In at least some of the data zones, for example, it is expected that the servo spokes 14 will split up at least some of the data fields 52, and each data field will include multiple embedded servo spokes.

By inspection of the FIG. 1 track pattern it is apparent that a TA occurring in one of the servo spoke fields could have a different consequence than if the TA occurred during the user data sector 16, or the different fields thereof.

FIG. 3 sets forth a high level block diagram of a hard disk drive 100 incorporating the principles of the present invention. FIG. 3 shows that the disk drive 100 is divided into an electromechanical head/disk assembly and a drive electronics section which is preferably contained on a small printed circuit board mounted to one major wall of the head/disk assembly. The head/disk assembly includes and registers relative positions of the disk 10 and the head structure 18 via a base 104. The head is positioned by the rotary voice coil actuator assembly 102 which is mounted to the base 104.

Figure 4:
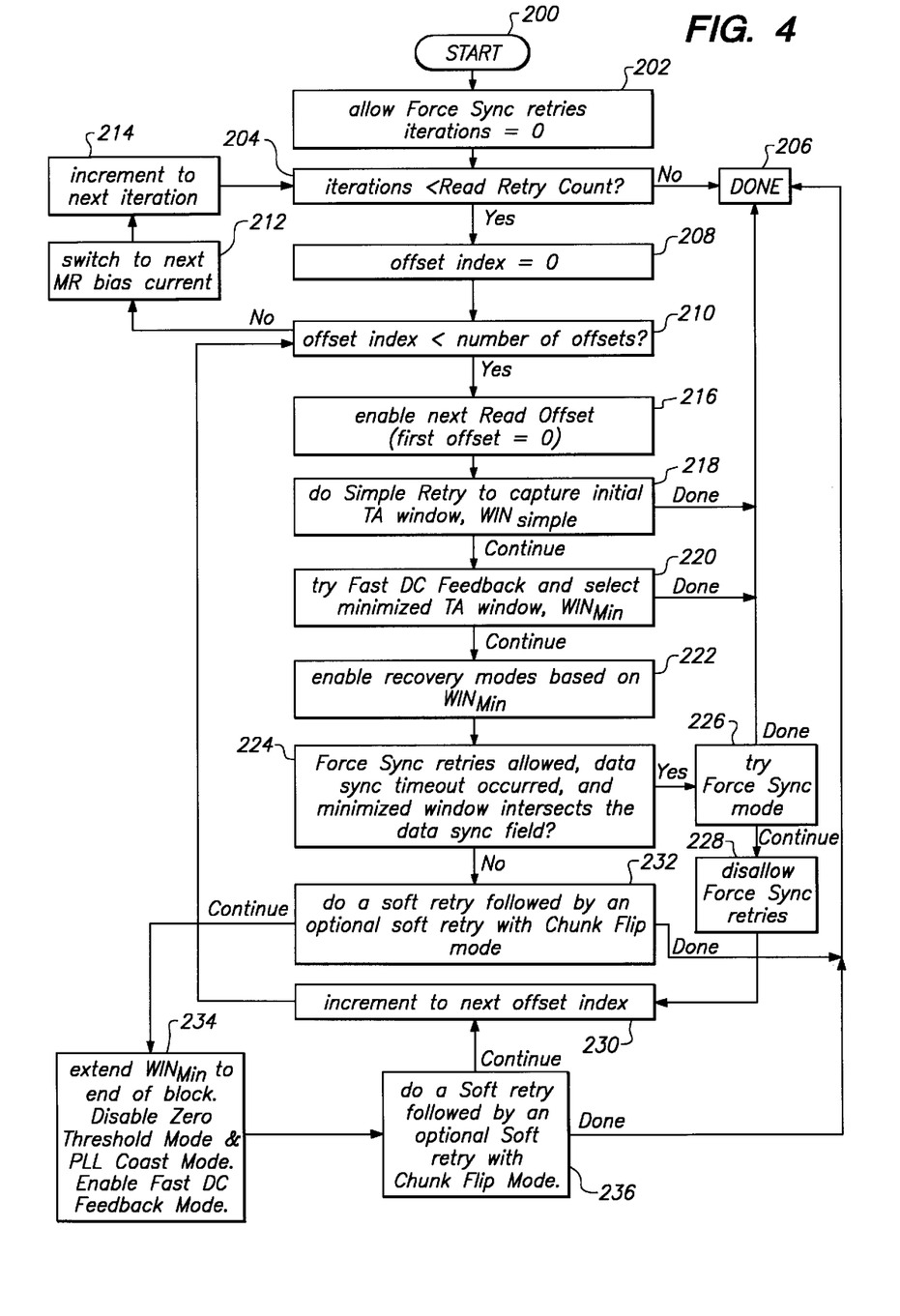
FIG. 4 is a flowchart of a TA recovery method carried out by the FIG. 3 disk drive during data reads in accordance with the present invention.

A spindle motor 106 is also mounted to the base 104, and the motor 106 rotates the disk 10 at a predetermined constant angular velocity. While only one disk 10 is shown in FIG. 4, those skilled in the art will appreciate that multiple disks may be stacked on a spindle assembly including the spindle motor 106. In that case, the actuator assembly 102 would include a stack of heads and head arms, each head being associated with a separate data storage surface of an adjacently facing disk. The heads 18 are attached to head arms by load beams and flexures which provide a spring preload function to bias the heads 18 towards the facing disk surfaces. Rotation of the disk(s) 10 by motor 106 creates an air bearing between the head and the adjacent surface, and the head flies on this air bearing in close proximity to the data surface. It is in this regime that thermal asperities occur, because the head 18 is relatively very close to the disk surface (e.g. <1–2 microinches separation). The preamplifier and head selector circuit 108 is also provided within the head/disk assembly in order to be as close to the transducers 18 as practical in order to minimize noise pickup.

The drive electronics includes the analog write/read channel chip 110, a digital controller and interface chip 114, at least one embedded standard microprocessor 114 (also including "glue" logic for the disk drive application), a head position servo controller chip 116, a data buffer array 118, a spindle motor controller 120, a flash ROM 122, a static RAM 124, and an EEPROM 126. The drive electronics includes a number of bus structures including a wideband digital bus 128 between the digital controller 112, microprocessor 114, flash ROM 122, and SRAM 124. An interface bus 130, implementing a conventional bus structure such as a SCSI bus, leads from the digital drive controller 112 to a host computing environment (not shown). A serial bus 132 interconnects the digital drive controller 112 and the analog write/read channel chip 110. This bus 132 carries the TA detect signal from the analog channel chip 110 to the digital drive controller chip 112, and the TA strobe signal in the opposite direction.

Other buses include a bus 134 between the digital drive controller and the data buffer 118 and head position servo controller 116, a bus 136 between the microprocessor 114 and the spindle motor controller 120, and a serial bus 138 between the microprocessor 114 and the EEPROM 126. A separate servo microcontroller or digital signal processor (DSP) may also be included for control of the head position servo loop, and in that event, the DSP may be connected between the digital controller ASIC 112 and the head position servo controller 116 control via a suitable bus structure, not shown.

Turning now to FIG. 4 a global error recovery strategy is implemented in the illustrated firmware flowchart. This firmware is stored in a suitable memory location, such as the flash ROM 122 and called and executed by the microprocessor 114 when a TA is detected by the read channel chip 110.

The global recovery algorithm for TAs is customized to the location of each detected TA and the type of operation being performed by the disk drive. TA recovery is invoked for each disk block in error on a given track. TAs are detected by the analog read channel chip 110, and a window, TA_detect, in time is captured. As shown in the FIG. 2 graph, this TA_detect window describes the physical boundaries of the TA within the track format. The TA_detect window is provided to the firmware so that one of a plurality of recovery modes may be invoked.

The read recovery algorithm for TA recoveries makes use of many recovery modes, some of which are adapted exclusively for TA recovery.

FIG. 4 illustrates a read recovery algorithm in accordance with principles of the present invention. The retry algorithm may include a series of soft retries during multiple rotations of the storage disk 10 over the TA site until the data is recovered, or until all of the alternative retries and recovery methods have been attempted. Each soft retry utilizes a unique recovery method. Some soft retries will be conditional, based on the determined location of the TA. The series of soft retries will iterate up to a maximum number of passes over the TA site by the head 18, the maximum number being set in a mode page location in firmware memory. Within each pass, soft retries will be performed at a number of different servo offsets, starting with an offset of zero. Offsetting of the head 18 will be combined with other recovery methods on each soft retry.

At the end of each pass, bias current of the MR read element 22 is switched to a next value. All soft retries in the subsequent pass over the TA site by the element 22 will use the next MR bias current value. If the number of passes exceeds the number of available bias current values, then the bias current value wraps around to the original bias current value. At the end of all passes during TA recovery mode, the bias current for MR element 22 is restored to its original or nominal value. Any soft retry which recovers the data causes the algorithm to stop performing soft retries immediately, and the routine is exited by the microprocessor 114.

Otherwise, the algorithm is continued by the microprocessor 114 until the number of retries is exhausted or the recovery time expires.

Referring to FIG. 4, the TA recovery algorithm begins at an entry state 200. A step 202 immediately follows entry which enables a Force Sync retries subroutine and sets the number of iterations through the FIG. 4 loop to zero. A step 204 determines whether the number of iterations through the FIG. 5 loop are less than the predetermined maximum Read Retry count value. If so, the algorithm has completed without recovering the data, and a "done" state 206 is reached, thereby ending the TA recovery effort for the present TA. If not, a step 208 is reached at which the offset index is set to zero.

Figure 5:
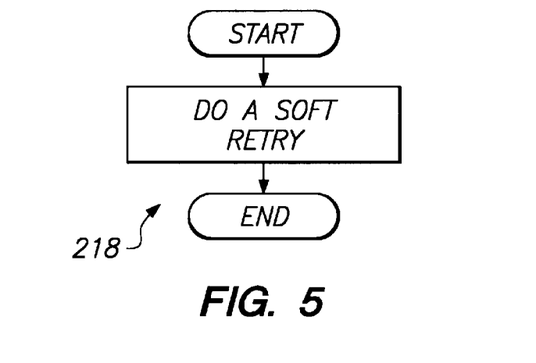
FIG. 5 is a flowchart of a simple retry subroutine which may be invoked within the FIG. 4 process flow.
Figure 6:
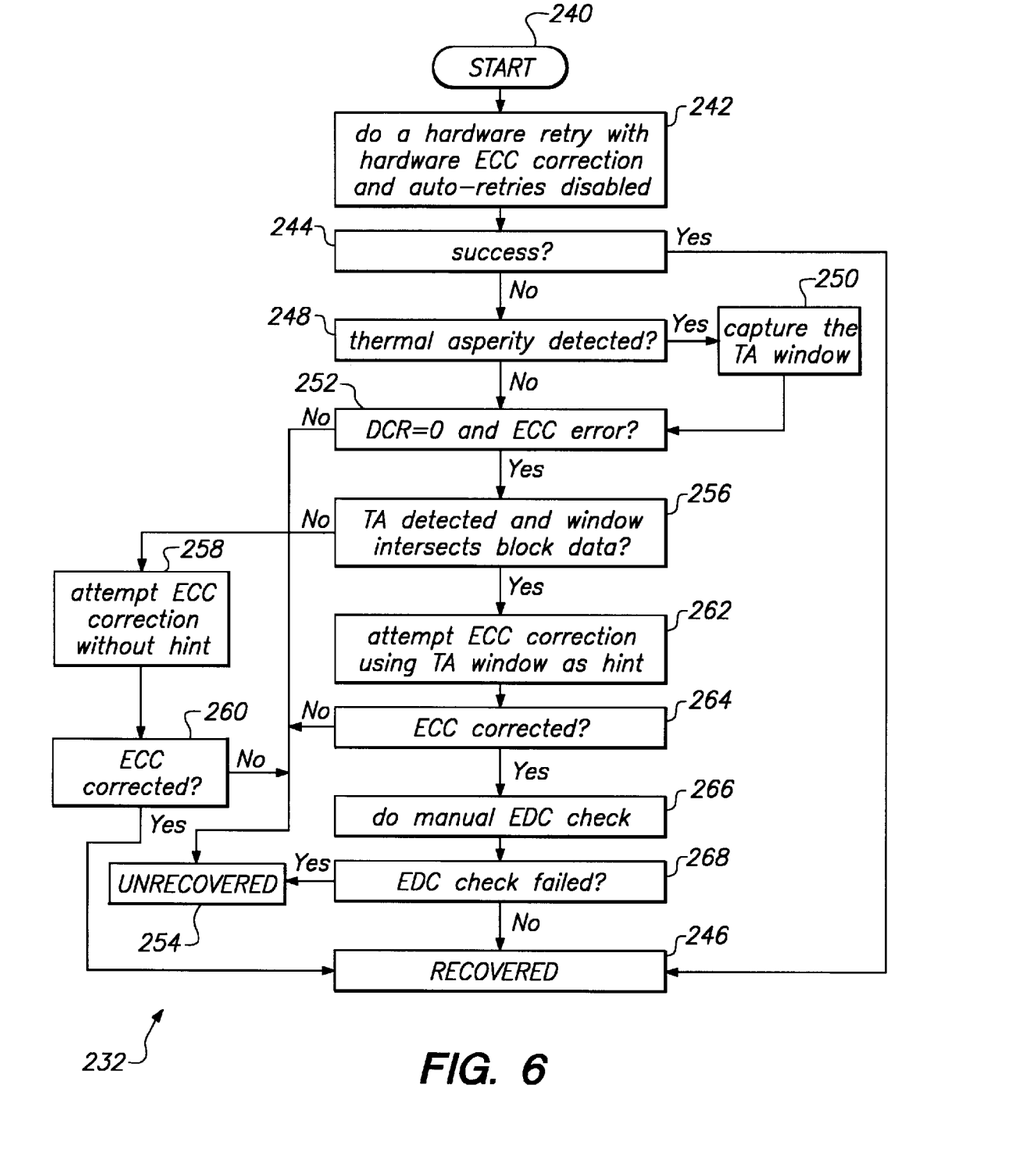
FIG. 6 is a flowchart of a soft retry subroutine which may be invoked within the FIG. 4 process flow.

A logical step 210 is reached at which the offset index is tested against a maximum number of offsets. If the offset index is greater than or equal to the maximum number, a step 212 is reached at which a switch is made to the next MR bias current step. A step 214 then increments the number of iterations, and returns to step 204 for a repeat pass through the FIG. 4 flow diagram. If the offset index is less than the number of offsets, as tested at the logical step 210, a step 216 is reached. The step 216 enables a next Read Offset. A step 218 then invokes a Simple Retry subroutine (FIG. 5) to capture the initial TA window, WIN simple. If the Simple Retry at step 218 recovers the data, the process is done, and the done state 206 is reached. If the data is not recovered, a step 220 is reached. FIG. 5 shows that the Simple Retry subroutine essentially comprises a call to the Soft Retry subroutine (FIG. 6).

Returning to FIG. 4, logical step 220 calls a Fast DC Feedback subroutine (FIG. 8) and selects the minimized TA window, WiNmin. If these steps recover the data, the process has successfully completed, and the done state 206 is reached. If not, further recovery modes based on the minimized TA window are invoked at a step 222. A logical step 224 determines whether a data sync time-out has occurred, and further determines if the minimized TA window WIN-min intersects the data sync field 56. If so, a Force Sync Retries subroutine (FIG. 11) is called and executed at a step 226. If the data is then recovered, the done state 206 is reached. If not, a step 228 is reached which disallows any further Force Sync retries during continuation of the recovery process, and a step 230 is reached which increments to the next offset index and returns process flow to the step 210.

If the minimized TA_Detect window does not intersect the data sync field as tested at step 224, a step 232 is reached which performs a soft retry followed by an optional soft retry after calling the Chunk Flip subroutine.

If the data is recovered, the done state 206 is reached, otherwise a step 234 is reached. Step 234 extends the minimized window WinMin to the end of the data block having the TA, disables the zero-threshold mode and PLL coast mode, and enables the Fast DC feedback mode. Then, a step 236 is reached. At step 236 an soft retry is attempted, followed by an optional soft retry with chunk flip mode. If the data is recovered, the done state 206 is reached. If not, recovery process flow continues to step 230.

A number of the recovery modes described in the FIG. 4 recovery process include calling a Soft Retry subroutine. The Soft Retry subroutine is shown in FIG. 6. For each pass through the Soft Retry subroutine, the read operation is retried for the block, with hardware auto-retries and hardware ECC disabled. If the retry encountered an ECC error, then firmware ECC correction may be invoked, FIG. 7. The software retry is careful to check a number of conditions before applying firmware ECC correction. First, the ECC error must be the "primary" error. Most other error conditions such as Data Sync Time-out take precedence over an ECC error. Second, a Disable Correction status from the applicable SCSI interface mode page must not be set. In addition, for corrections of TA induced errors, a software EDC check is performed to validate the correction.

The flowchart illustrating the Soft Retry subroutine is shown in FIG. 6. This subroutine begins at an entry state 240. A process step 242 causes a hardware retry to be attempted with the hardware ECC function and the auto-retries function disabled. A logical node 244 detects whether the hardware retry is successful. If so, a data-recovered state 246 is reached and the TA recovery algorithm is exited. If not, a logical step 248 determines if a TA has been detected. If yes, the TA window, TA_Detect, shown in FIG. 2, is captured at a step 250. Whether or not a TA is detected at step 248, a next logical step 252 is reached at which a DCR=0 ( if DCR=1, a SCSI disable-ECC mode is invoked) and an ECC error status flag are checked. If these flags are false, then an unrecovered data state 254 is reached. If these flags are true, then a logical step 256 is reached which determines whether a TA is detected and whether the TA window, TA_Detect, intersects a user data block. If not, a step 258 is reached which attempts ECC correction without reliance upon the TA window location as a hint. If the ECC correction is successful, as tested at a logical step 260, the recovered data state 246 is reached. If the ECC correction is unsuccessful, the unrecovered data state 254 is reached.

Figure 7:
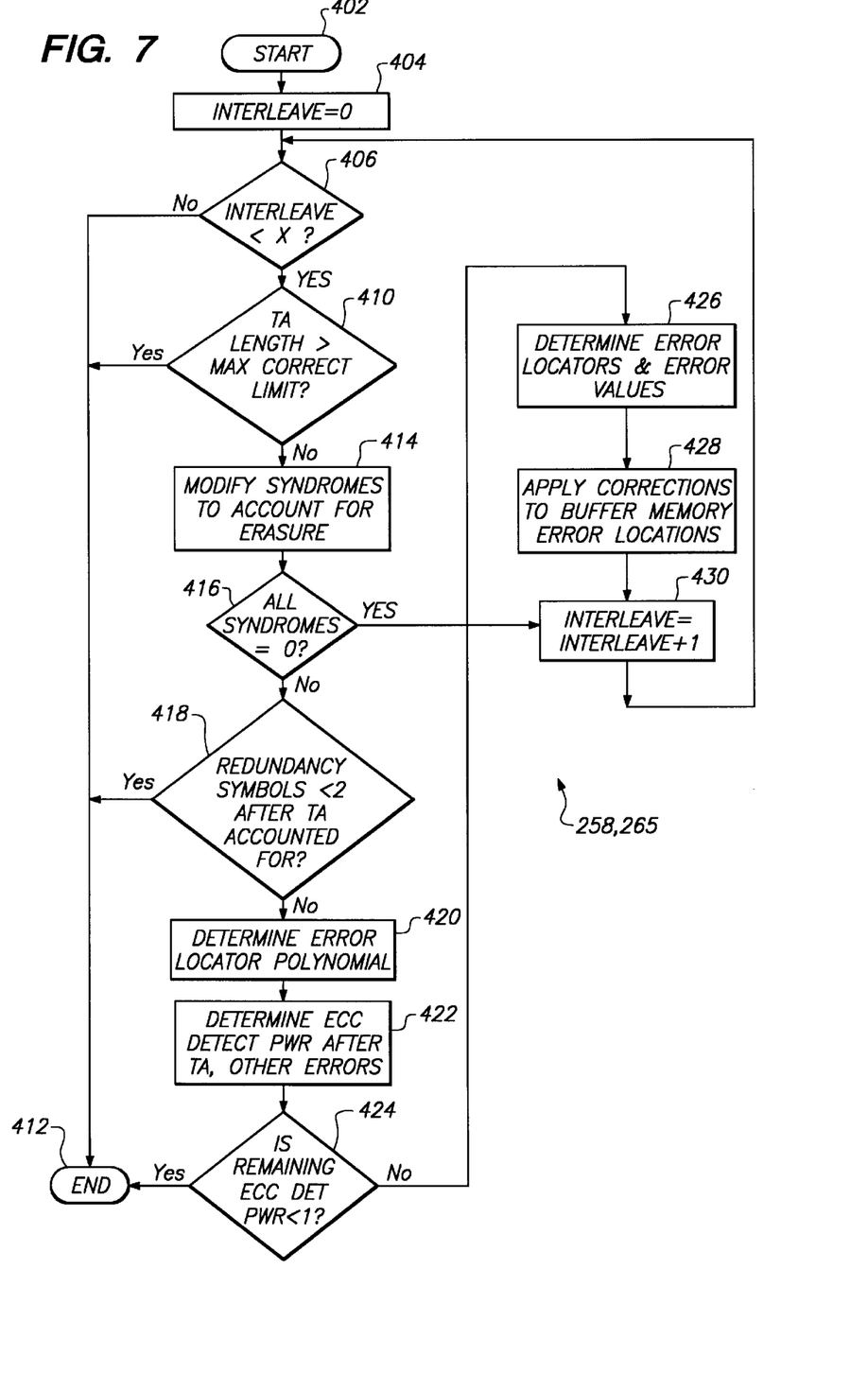
FIG. 7 is a flowchart of an error correction subroutine which may be invoked within the FIG. 4 process flow.

If the TA window, TA_Detect, is determined to intersect a user data block location in a data sector 16, as tested at step 256, a step 262 is reached which attempts data recovery using the TA window as a location hint for the ECC process as shown in FIG. 7. If the ECC process is not successful, as tested at a logical step 264, the unrecovered state 254 is reached. However, if the ECC process is successful, a step 266 is reached at which a manual EDC step is carried out. A logical step 268 then checks whether the manual EDC step failed. If so, the unrecovered state 254 is reached; otherwise, the recovered state 246 is reached. States 246 and 254 mark subroutine exit states for returns to the main algorithm of FIG. 5.

Another step 218 calls a Simple Retry subroutine, shown in FIG. 5. The Simple Retry subroutine 218 attempts to recover the data using a soft retry, possibly in combination with enhanced ECC, Read-Offsetting, and/or MR bias current switching (depending upon the number of prior iterations through the FIG. 4 recovery algorithm). If the data is not recovered by Simple Retry, the TA window TA_Detect is captured in WINsimple, and the recovery algorithm of FIG. 4 continues.

After WINsimple is captured by the Simple Retry subroutine 218, FAST DC feedback mode is used to try to minimize duration of the TA window. Fast DC mode reduces the time duration of the TA detection window shown in FIG. 2 as waveform TA_Detect_B. If Fast DC Feedback is effective in minimizing the window, it will be enabled for use in conjunction with other recovery modes, if required. Skip Spoke mode is configured accordingly for the selected TA window, i.e. if the TA window intersects a servo spoke 14, then skip spoke mode will be enabled for that spoke in subsequent soft retries.

Figure 8:
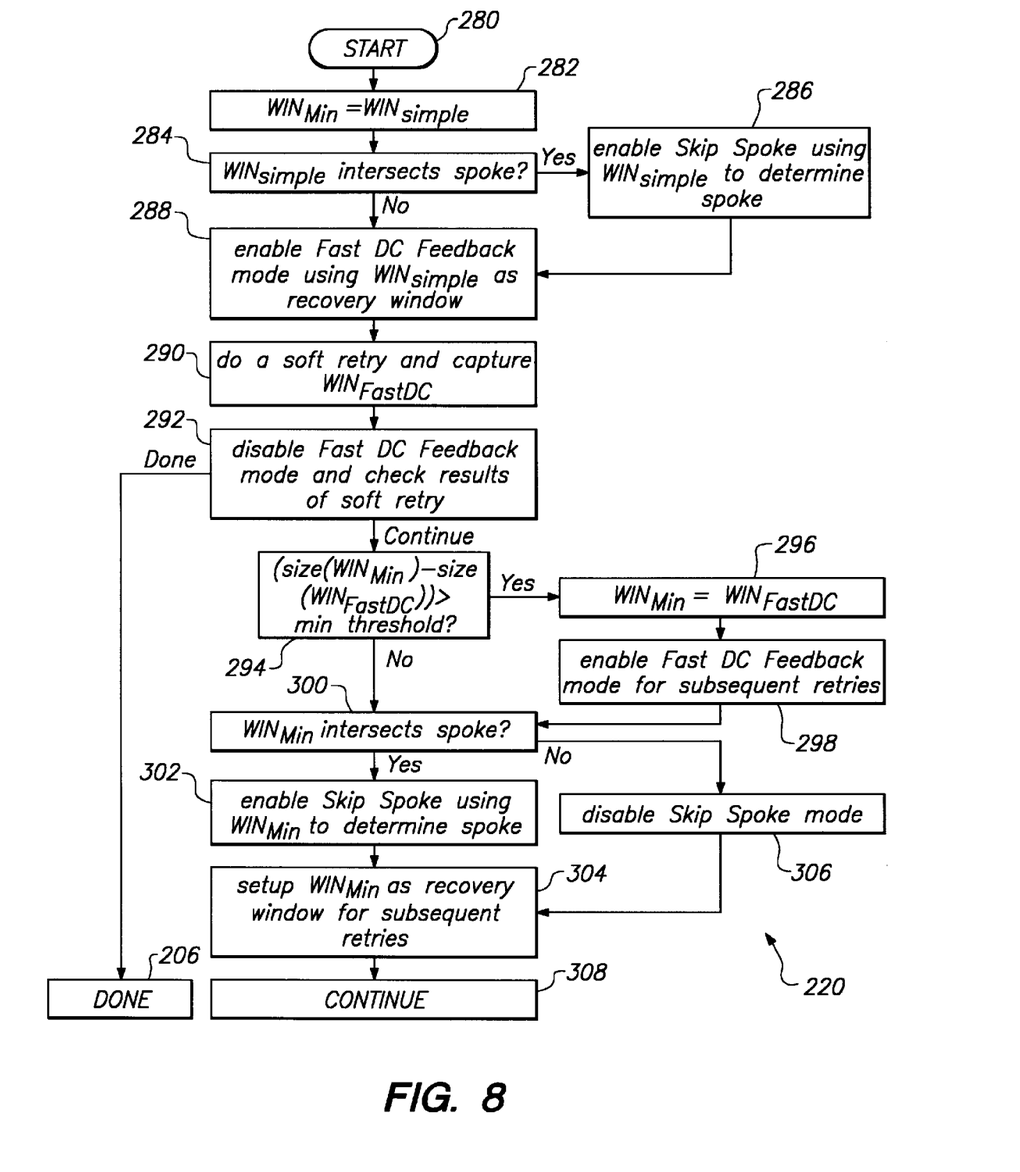
FIG. 8 is a flowchart of a minimize TA window with fast feedback subroutine which may be invoked within the FIG. 4 process flow.

Turning now to FIG. 8, the Window Minimization subroutine begins at an entry state 280. A step 282 sets the WINmin value to be equal to the WINsimple value. A step 284 determines if the WINsimple window intersects a servo spoke 14. If so, a step 286 enables a Skip Spoke subroutine using the WINsimple window to determine which spoke will be skipped. If not, or upon completion of step 286, a step 288 is reached which enables the FAST DC Feedback mode using the WINsimple window as the data recovery window.

A step 290 calls the Soft Retry subroutine and a new window WINfastDC is captured. A step 292 is then reached which disables the FAST DC Feedback mode and which checks the results of the soft retry. If the data is recovered, the done state 206 is reached. If the data is not recovered, a step 294 is reached.

The logical step 294 tests whether the size of the minimized window WINmin minus the size of the new window WINfastDC is greater than a minimum threshold value. If so, the minimized window WINmin is made equal to the new window WINfastDC at a step 296, and a step 298 enables the Fast DC Feedback mode for any subsequent retries. If not, or after completion of step 298, a step 300 is reached which determines whether the WINmin window intersects a servo spoke 14. If so, a step 302 is reached which enables the Skip Spoke mode by using the WINmin window location to determine the identification of the particular servo spoke 14. If not, the Skip Spoke mode is disabled at a step 306. Then, a step 304 is reached which sets up the WINmin window as the recovery window for subsequent TA recovery retries, and a continue state 308 is reached at which the Window Minimization subroutine is left and program flow returns to the main TA recovery algorithm of FIG. 4.

Additional TA recovery modes are enabled according to the location of the minimized TA window WINmin. AGC Preset mode is used if the window WINmin is within the AGC Preset portion 50 of the data sector preamble. The AGC Preset mode is configured using a predetermined value based upon a particular data zone of-the track containing the TA.

PLL coast mode is used if the window WINmin intersects a data sync field 56 or a user data block 58, providing the window WINmin does not also intersect a servo spoke 14 or the data preamble fields 50, 52 or 54. A Zero Threshold recovery mode is used if the window WINmin intersects a data sync field 56 or the data block field 58 and the beginning of the data preamble (fields 50, 52 or 54), providing the window WINmin does not also intersect a data sync field 56 or a data block field 58.

Figure 9:
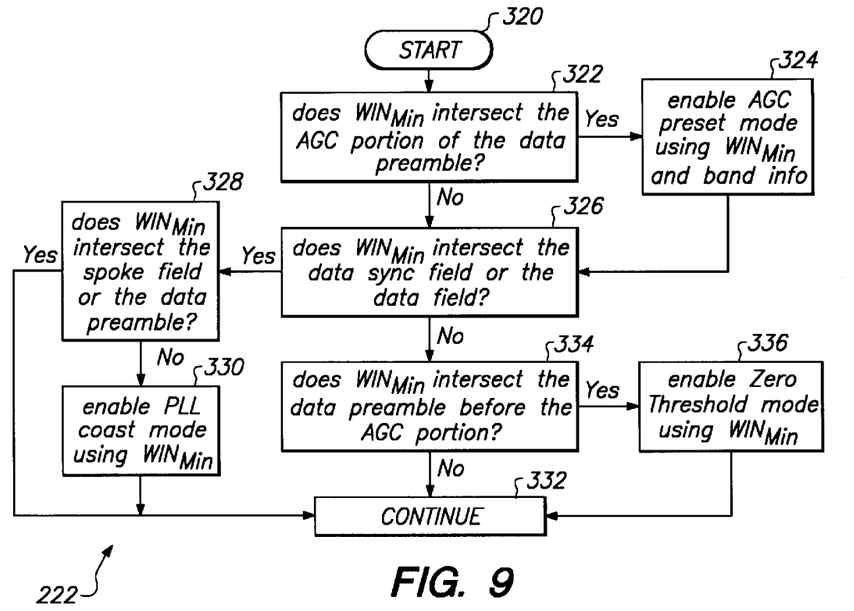
FIG. 9 is a flowchart of a subroutine enabling TA recovery modes based on a minimized TA window which may be invoked within the FIG. 4 process flow.

FIG. 9 is a flowchart of a subroutine for enabling TA recovery modes based upon use of the minimized TA window WINmin. This subroutine begins at an entry state 320. A logical step 322 determines whether the minimized window WINmin intersects the AGC field 50 within the data preamble of a data sector 16. If so, a step 324 enables the AGC Preset mode by using the WINmin location and a preset derived from the particular data zone including the track 12 having the TA. If not, or upon completion of step 324, a step 326 is reached which determines whether the minimized window intersects the data sync field 56 or the data block 58. If so, a logical step 328 is reached which determines whether the minimized window WINmin intersects the servo spoke 14 or the data preamble (fields 50–54). If not, a step 330 is reached which enables the PLL Coast mode using the WINmin window as a gate, and a continue state 332 is reached. The state 332 is reached directly from step 328 if the decision reached is true.

If the step 326 determines that the minimized window WINmin does not intersect the data sync field 56 or the data block 58, a step 334 is reached. Logical step 334 determines whether the minimized window WINmin intersects the data preamble before the AGC portion. If so, a step 336 is reached which enables the Zero Threshold recovery mode using WINmin as a gate. Then, the continue state 332 is reached. The continue state is reached directly from step 334 if its logical result is negative.

Figure 10:
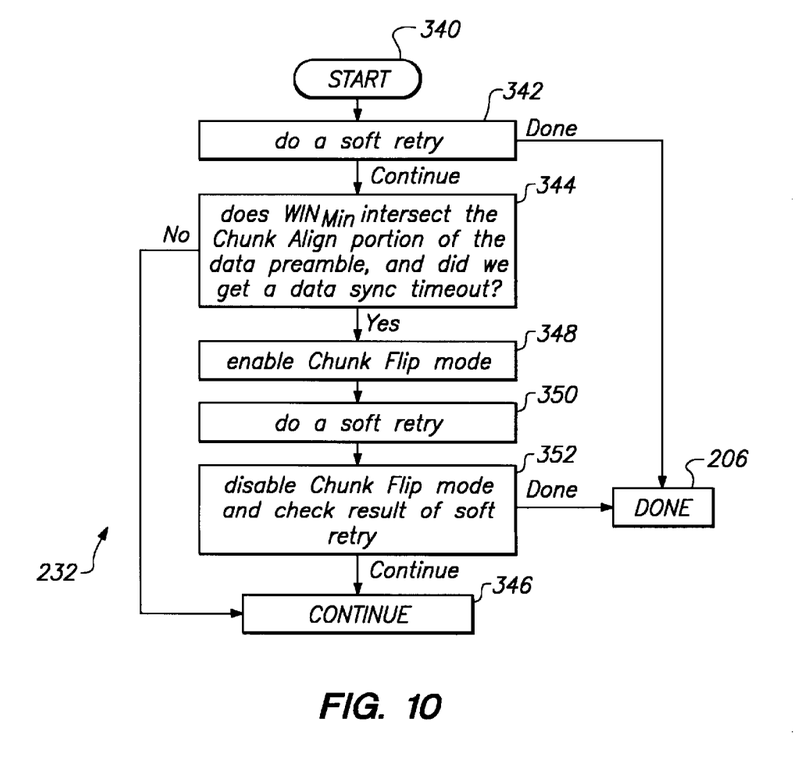
FIG. 10 is a flowchart of a subroutine enabling a soft retry followed by an optional retry with a chunk flip mode which may be invoked within the FIG. 4 process flow.

The subroutine supporting step 232, Soft Retry with Optional Retry with Chunk Flip, is illustrated in FIG. 10. An additional retry is performed with Chunk Flip mode if the minimized window WINmin intersects the Chunk Align portion 54 of data preamble and a data sync time-out error has occurred. This subroutine 232 includes an entry state 340 leading to a first step 342 which performs a soft retry by calling the FIG. 6 Soft Retry subroutine. If the soft retry is successful, the done state 206 is reached. If not, a step 344 is reached which tests whether the minimized window WINmin intersect the Chunk Align field 54 and whether a data sync timeout has occurred. If not, a continue state 346 is reached which marks an exit from this subroutine. If so, a step 348 is reached which enables the Chunk Flip mode. Then, another soft retry is attempted at a step 350. A step 352 is then reached which disables the Chunk Flip mode, and which checks the result of the soft retry. If successful, the done state 206 is reached. If not successful, the TA recovery algorithm is continued at state 346.

If the minimized window WINmin intersects the data sync field 56 and a data sync time-out error occurred, then Force Sync mode 226 is applied. Force Sync mode 226 is shown as a subroutine in FIG. 11. Force Sync mode retries are only permitted to execute once per disk block, due to time constraints. The Force Sync mode 226 subroutine executes up to e.g. 30 consecutive soft retries for each member of e.g. seven potential Force Sync offset values. If the TA window WINmin intersects the Chunk Align field 54 of the data preamble, the a second soft retry using Chunk Flip mode is carried out.

If the data is not recovered after attempting all soft retries for all Force Sync offset values, this mode is disabled, and the FIG. 4 TA recovery algorithm continues.

Figure 11:
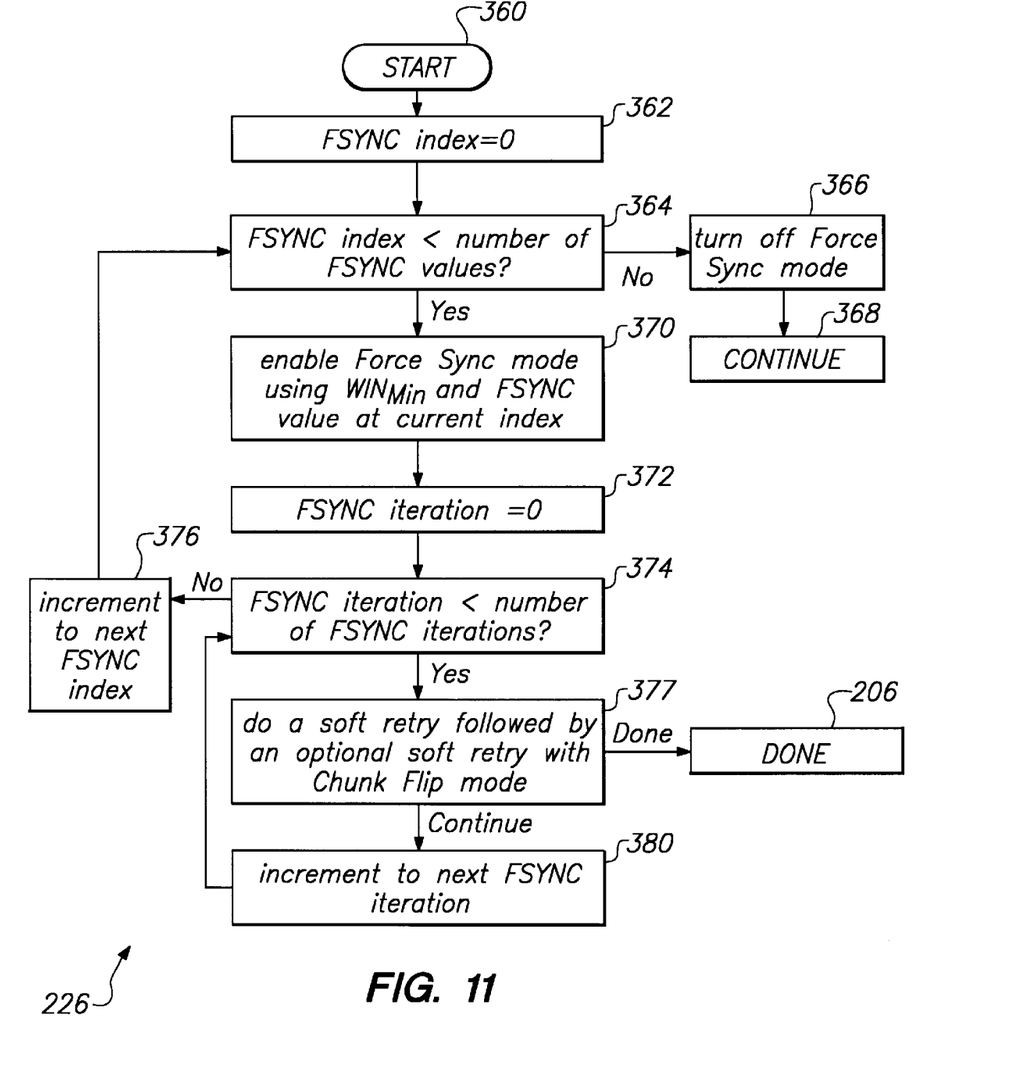
FIG. 11 is a flowchart of a subroutine which performs retries while forcing data sync, which may be invoked within the FIG. 4 process flow.

As shown in FIG. 11 the Force Sync mode subroutine 226 begins at an entry state 360. A step 362 presets a Force Sync index value to zero, marking the first pass through this subroutine 226. A logical step 364 then determines whether the Force Sync index value is less than a maximum number, e.g. 7, of Force Sync index values. If not, meaning that Force Sync retries have been attempted at the e.g. 7 possible sync locations in the format, a step 366 turns off the Force Sync mode, and a continue state 368 is reached at which this subroutine is exited. If the present Force Sync index value is below the maximum value, as tested by step 364, a step 370 is reached. Step 370 enables the Force Sync mode using the WINmin location and the FSYNC value at the current index number. A counting step 372 is then reached. The Force Sync iteration value is initially set to zero in step 372, and is incremented during each pass through step 380. A logical node 374 tests whether the Force Sync iteration number is less than a maximum number of Force Sync iterations. If not, a step 376 increments to a next Force Sync index number, and a return is made to step 364. If so, a step 377 calls the Do Soft Retry Followed by Optional Soft Retry with Chunk Flip mode subroutine 232 which executes. Following execution of subroutine 232, the result is tested at step 377. If the data is recovered, the TA recovery algorithm done state 206 is reached. If the data remains unrecovered at step 377, a step 380 increments to the next Force Sync iteration value, and a return is made to the step 374.

As noted above, during the Soft Retry subroutine outlined in FIG. 6, two process steps concern execution of ECC correction routines, i.e. blocks 258 and 262, with the flow path for block 258 being a subset of the steps followed for block 262. Preferred ECC process flow is graphed in FIG. 7.

In FIG. 7 ECC correction process flow starts at an entry point 402 and progresses to a process block 404 which sets an interleave variable to an initial interleave value of zero, i.e. the first ECC interleave to be processed. A logical node 406 determines if the interleave variable is less than X, which represents a set number of interleaves based upon the ECC data design, such as two, three or four. If the set number has been reached, an ECC end node 408 is reached. If not, a logical node determines whether the TA error burst length is greater than a maximum burst error length correction capability of the ECC system employed by the drive 100. If so, an ECC end node 408 is reached, and program flow returns to the FIG. 4 TA correction algorithm. If not, a process step 414 is reached which modifies the recovered ECC error syndrome to account for erasure. A logical node 416 determines if all syndromes for the current ECC interleave are equal to zero, meaning that an error has not been detected in the current interleave by the ECC system. If so, ECC processing is continued at step 430 which increments to a next ECC interleave. If not, a logical node 418 is reached which determines whether the number of redundancy symbols for the current interleave are less than two after the thermal asperity is accounted for. If so, the ECC process has failed and the end node 408 is reached. If not, a step 420 is reached. Step 420 determines the error location via the error locator polynomial, via conventional ECC techniques not particularly pertinent to the present invention. Then, a step 422 is reached. Step 422 determines the remaining ECC error burst detection power for the corrupted data block after the TA and any other error are accounted for. A logical node 424 determines if the remaining detection power is less than one. If so, the ECC process is terminated at end node 408. If not, a process step 426 is reached. Step 426 determines the error locations and error values, again by employing any suitable conventional ECC methodology (and may include cross-check processes to ensure against miscorrection of data). A step 428 then causes the corrupted data block to be corrected in the cache buffer memory 118.

A step 430 increments the interleave count by one unit, and returns process flow to step 406 for the next ECC interleave. This process continues until all ECC interleaves of the data block have been processed.

Block 258 follows a subset of the steps graphed in FIG. 7 and omits steps 410, 414, and 418; and, includes steps 402, 404, 406, 408, 416, 420, 422, 424, 426, 428 and 430.

In summary and with reference again to FIG. 2, the Simple Retry (FIG. 5) captures a "raw" TA_Detect_A window, directly from the analog channel 110 by reference to the TA_Assert threshold on the rising edge of the TA, and by reference to the TA_Deassert threshold on the falling edge of the TA. TA_Strobe_B is generated by the digital controller ASIC 112 based on WINsimple (duration of TA_Detect_A), and a Fast DC Feedback retry captures the next TA detection window, TA_Detect_B which has a rising edge which is likely to be aligned to the rising edge of TA_Detect_A, and a trailing edge occurring significantly earlier than TA_Detect_A, and a period of WINfastDC. The WiNsimple period is compared to the WINfastDC period, and the smaller window, TA_Detect_A, or TA_Detect_B, becomes WINmin.

Those skilled in the art will thus appreciate that the method of the present invention provides a comprehensive approach for recovering data initially corrupted by a thermal asperity. By providing a mechanism for identifying the precise TA locations a more powerful ECC recovery algorithm may be invoked (since conventional ECC processes have to determine error burst location as well as values). In addition, the TA location information enables the recovery process to select a read channel modification which maximizes the probability of data recovery for different TA locations. Also, the present approach provides a data recovery method for a TA otherwise corrupting a data sync field needed for PLL synchronization before being able to read back and recover the data block.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. In a hard disk drive including a rotating data storage disk, a head transducer structure including a magnetoresistive (MR) read element and positioned by a head position servo over the disk for data writing and reading operations to and from a selected data track of a multiplicity of concentric data tracks formatted in accordance with a predetermined track format including data sectors separated by embedded servo spokes, a read channel connected to the read element, and a digital data handling and control section connected to the read channel for handing data block transfers between the data storage disk and a host computing environment, a method for recovering data from the selected data track the presence of a thermal asperity (TA) induced in the read element by head-disk contact comprising the steps of:

A. providing a plurality of TA data recovery modes including:
  incrementally radially offsetting of the MR read element within the track by the head position servo;
  adjustment of DC bias current of the MR read element;
  increasing DC cancellation bandwidth to enable faster tracking of baseline shift of the read signal;
  overriding pulse threshold amplitude qualification processes for handling TAs occurring in a data preamble field or a data sync field of the track format;
  asserting a coast mode at the read channel over the TA to reduce analog channel saturation;
  forcing a data pattern alignment reversal of a TA-distorted data phase decision;
  using separate data detection thresholds for positive and negative data pulses;
  coasting a data clock phase locked loop for the duration of a TA;
  invoking a drive-resident error correction code process which uses determined TA location as error burst location within the process;
  substituting previously read servo head position information for servo head position information distorted by a TA;
B. electrically detecting a TA in the read channel during a pass of the head over the selected data track,
C. correlating location of the detected TA to the track format,
D. selecting a first one of the plurality of thermal asperity data recovery modes based upon the location of the TA, and
E. applying the selected at least one of the plurality of available thermal asperity recovery modes during a next pass of the head over the selected data track in an attempt to recover data otherwise rendered unavailable by the TA.

2. The method for recovering data set forth in claim 1 wherein the selected first one of the plurality of thermal asperity recovery modes includes an adjustable recovery mode parameter, and performing an additional step of:

F. changing at least one mode recovery parameter of step D and repeating step E until data is recovered or a predetermined maximum number of attempts, each using a different setting of the recovery mode parameter, have been attempted for said TA.

3. The method for recovering data set forth in claim 2 comprising after performing a predetermined maximum number of attempts to recover data in step F, performing an additional step of:

G. selecting a second one of the plurality of thermal asperity data recovery modes and repeating steps D, E and F.

4. In a hard disk drive including a rotating magnetic data storage disk, a head transducer structure including a magnetoresistive read element and positioned over the disk for data writing and reading operations to and from a formatted data track by a head position servo control loop, a read channel connected to the read element, a digital data handling and control section connected to the read channel for handing data block transfers between the data storage disk and a host computing environment, and an embedded digital processor for controlling the read channel, the head position servo control loop, and the digital data handling and control section, there being a plurality of thermal asperity data recovery routines available to the digital processor for altering electrical characteristics of the read channel, servo control loop, and/or the digital data handling and control section, a method for recovering data from the formatted data track of the rotating data storage disk in the presence of thermal asperities comprising the steps of:

detecting occurrence of a thermal asperity as an analog signal in the read channel during a pass of the head transducer structure over the formatted data track, generating and transferring a digital thermal asperity detect signal to the digital data handling and control block marking occurrence of the thermal asperity, determining with the digital processor a format location of the thermal asperity in the formatted data track, selecting one of the plurality of thermal asperity data recovery routines available to the digital processor, said selection being based upon the format location of the thermal asperity, and applying via the digital processor the selected one of the plurality of available thermal asperity recovery routines to the read channel and/or the digital data handling and control section during a next pass of the head transducer structure over the formatted data track to recover data otherwise rendered unavailable by the thermal asperity.

5. The data recovery method set forth in claim 4 wherein the step of applying the at least one of the plurality of available thermal asperity recovery routines comprises the step of offsetting radial head position with the head position servo control loop by a predetermined incremental radial distance in an attempt to avoid a thermal asperity.

6. The data recovery method set forth in claim 4 wherein the formatted data track includes circumferentially spaced apart radially extending servo sectors separating data sectors.

7. The data recovery method set forth in claim 6 wherein the location determining step fixes a location of the thermal asperity within a servo sector and the step of applying the selected recovery routine causes head position information read from the servo sector to be ignored by the head position servo control loop.

8. The data recovery method set forth in claim 6 wherein the step of locating the TA determines a TA occurrence at one of the embedded servo sectors, and the step of applying the selected one of the plurality of available thermal asperity recovery routines comprises substituting servo information derived from another servo sector in lieu of servo information from the servo sector having the TA.

9. The data recovery method set forth in claim 4 wherein the formatted data track is divided into data sectors having gain setting, phase setting, data sync and user data block fields and wherein the user data block fields include error correction code remainder byte subfields.

10. The data recovery method set forth in claim 9 wherein the location determining step fixes a location of the thermal asperity within a said user data block field and wherein the step of applying the selected recovery routine comprises the step of performing an error correction code process upon a user data block by using determined location of the thermal asperity as a burst error location within the error correction code process.

11. The data recovery method set forth in claim 10 wherein the step of performing an enhanced error correction code process includes the step of performing an error detection code check upon the corrected data block to verify against miscorrection of data.

12. The data recovery method set forth in claim 9 wherein the location determining step fixes a location of the thermal asperity within a data sync field, and wherein the step of applying the selected recovery routine comprises the steps of iteratively adjusting timing phase of a data recovery timing loop of the read channel to synchronize a data detection process to the data block.

13. The data recovery method set forth in claim 9 wherein the location determining step fixes a location of the thermal asperity within a data gain setting field and wherein the step of applying the selected recovery routine includes the step of presetting an automatic gain control parameter within the analog read channel to a predetermined value.

14. The data recovery method set forth in claim 13 wherein the step of presetting an automatic gain control parameter within the analog read channel to a predetermined value is based upon a radial location of the formatted data track including the thermal asperity.

15. The data recovery method set forth in claim 9 wherein the location determining step fixes a location of the thermal asperity as within a data sync field and wherein the step of applying the selected recovery routine includes the step of forcing a data sync realignment within the read channel.

16. The data recovery method set forth in claim 2 wherein the step of applying the selected recovery routine includes the step of increasing a DC cancellation bandwidth of an analog portion of the read channel, thereby enabling faster tracking of a baseline shift of the read signal during the thermal asperity.

17. The data recovery method set forth in claim 4 wherein the step of applying the selected recovery routine includes the step of asserting a "coast" mode in an analog portion of the read channel wherein voltages on AC coupling capacitors of the analog portion are held during a thermal asperity baseline shift, thereby reducing a likelihood of analog channel saturation.

18. The data recovery method set forth in claim 4 wherein the step of applying the selected recovery routine includes the steps of establishing and using separate positive and negative tracking thresholds for signal qualification within an analog portion of the read channel.

19. The data recovery method set forth in claim 4 wherein the step of applying the selected recovery routine includes the steps of:

performing a simple retry routine for capturing a raw TA_Detect data window (WINsimple), generating a control signal TA_Strobe based on the captured raw TA_Detect data window (WINsimple), performing a fast DC feedback retry routine to capture a subsequent TA_Detect window (WINfastDC), comparing duration of the raw TA_Detect window (WINsimple) with the subsequent TA_Detect window (WINfastDC), and selecting and using a shorter duration one of the compared windows (WINsimpLee and (WINfastDC) as a minimized window (WINmin) during a subsequent pass of the head transducer structure over the formatted data track in an attempt to recover data otherwise rendered unavailable by the thermal asperity.

20. The data recovery method set forth in claim 19 wherein the step of using the minimized window (WINmin) comprises the step of determining if the minimized window (WINmin,) lies within a gain control field, and if so invoking a preset automatic gain control recovery routine during an interval of WINmin.

21. The data recovery method set forth in claim 20 wherein the disk drive comprises a multiplicity of formatted data tracks arranged as a plurality of radially separated concentric data zones wherein data transfer rate is optimized for a radius of each data zone, and wherein the step of invoking the preset automatic gain control recovery routine also uses information relating to a data zone including the TA.

22. The data recovery method set forth in claim 19 wherein the step of using the minimized window (WINmin) in subsequent TA recovery processing comprises the steps of determining if the minimized window (WINmin) intersects a data preamble portion before the gain control field, and if so invoking a Zero Threshold recovery routine during an interval of WINmin.

23. The data recovery method set forth in claim 19 wherein the step of using the minimized window (WINmin) during a subsequent pass of the head transducer structure over the formatted data track comprises the steps of determining if the minimized window (WINmin) intersects one of the data sync field and the data field, and if so, invoking a PLL coast recovery routine during an interval of WINmin.

* * * * *